March 10, 1936.  G. F. YAGER ET AL  2,033,317
MOLDING APPARATUS
Original Filed Oct. 26, 1933    4 Sheets-Sheet 1
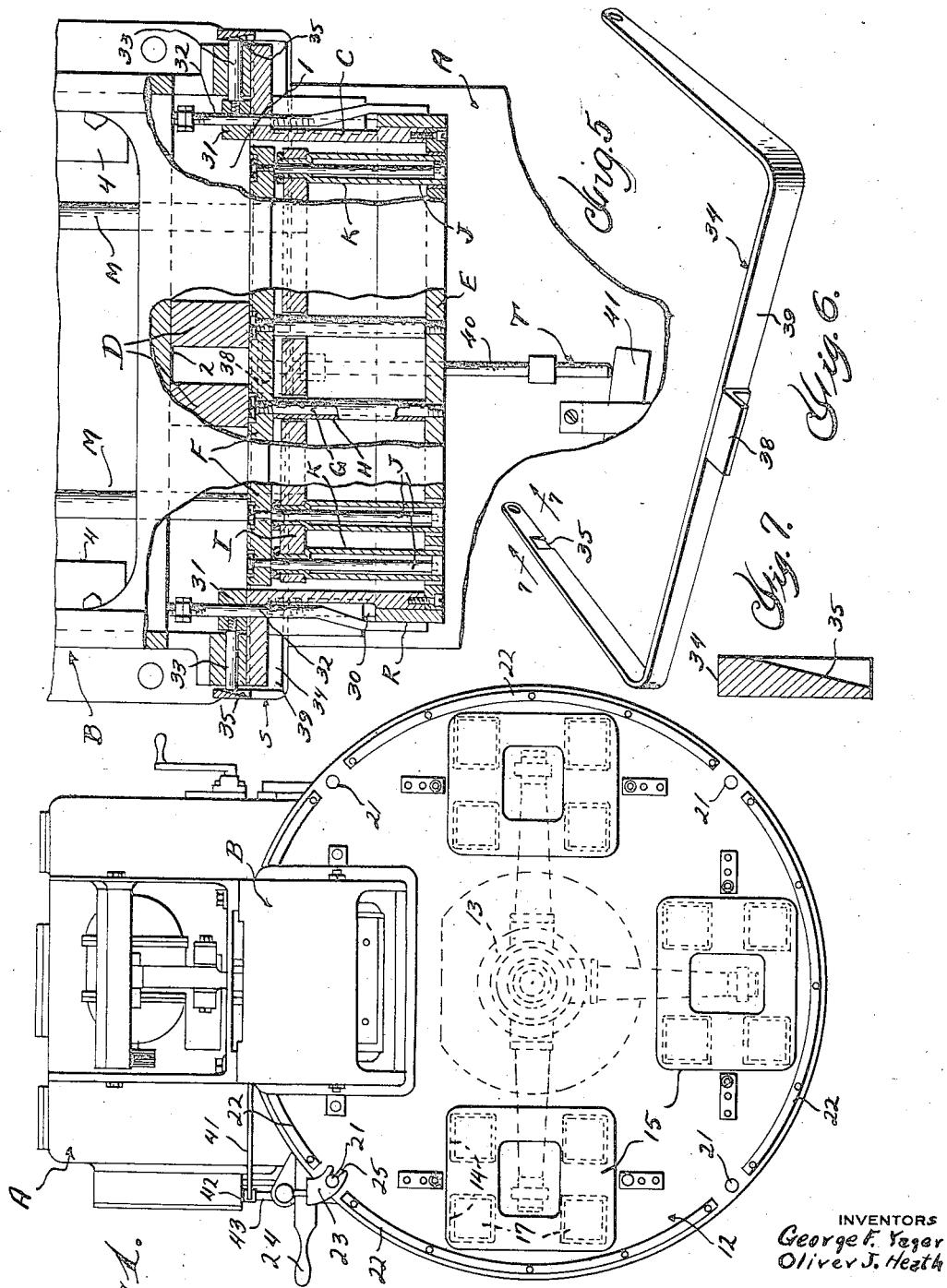
INVENTORS
George F. Yager
Oliver J. Heath
BY
ATTORNEY

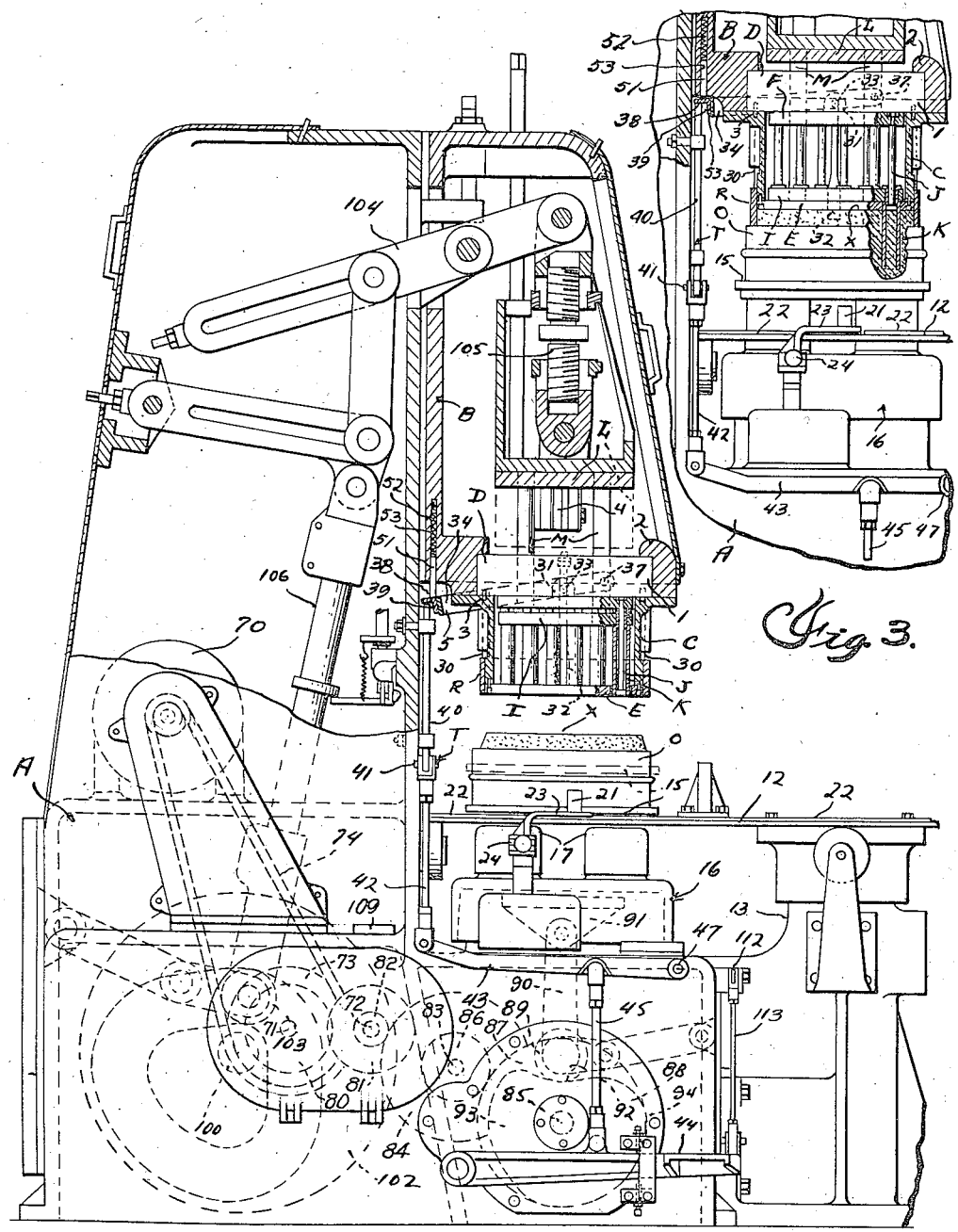

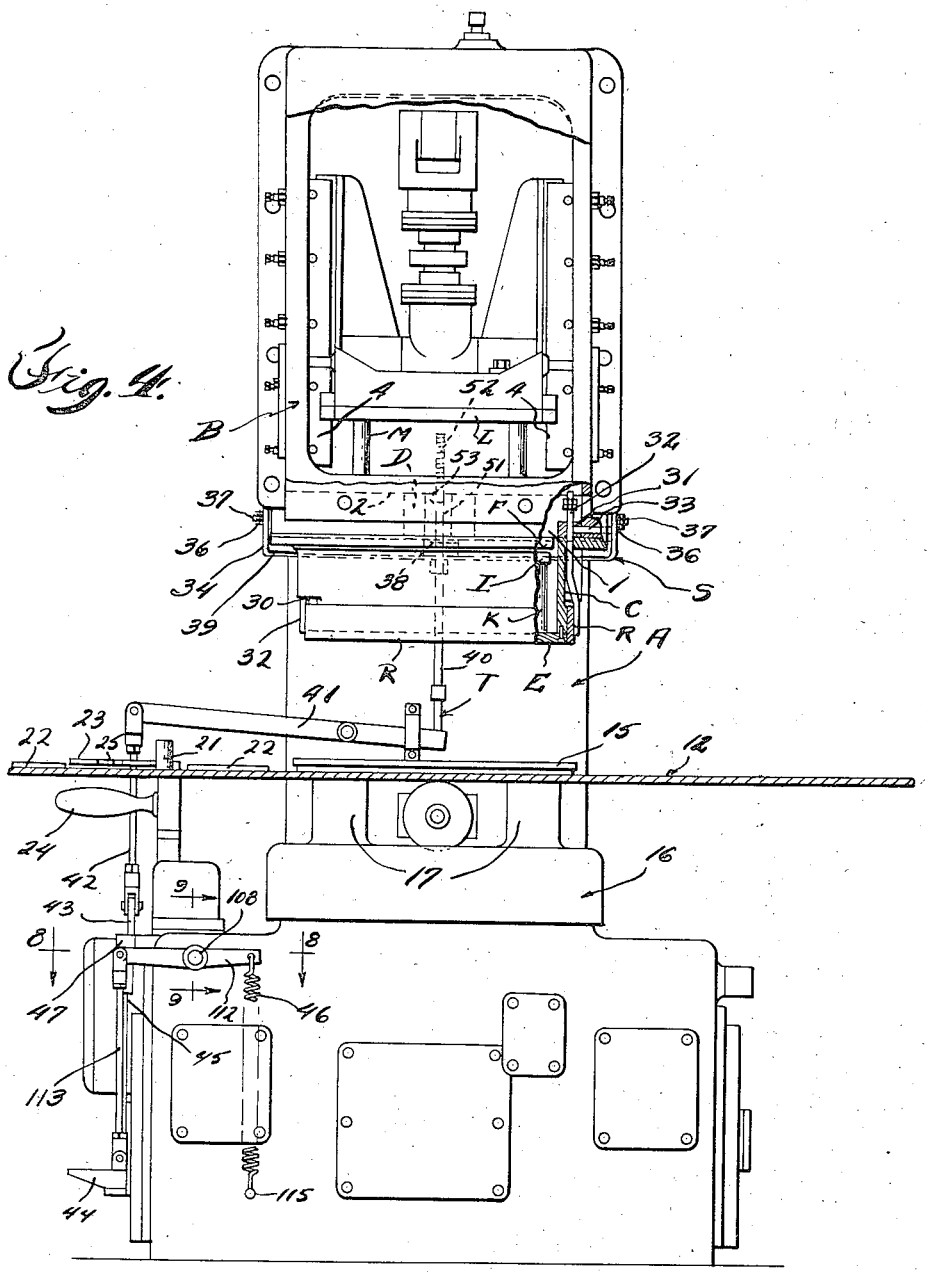

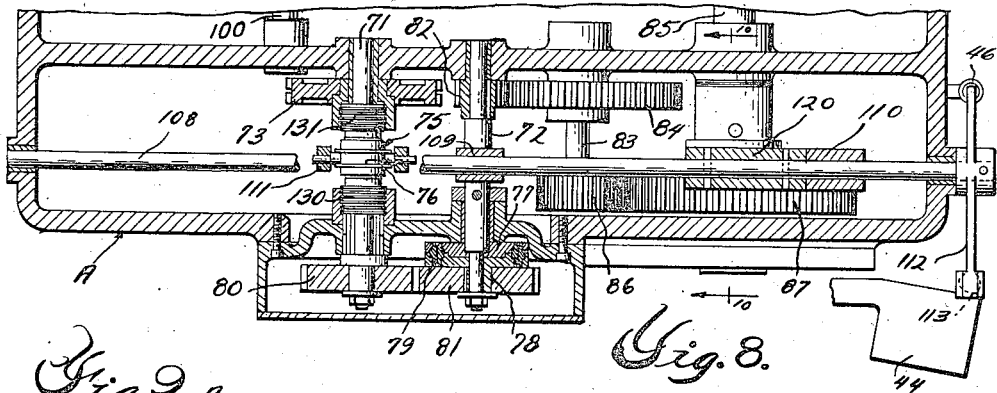
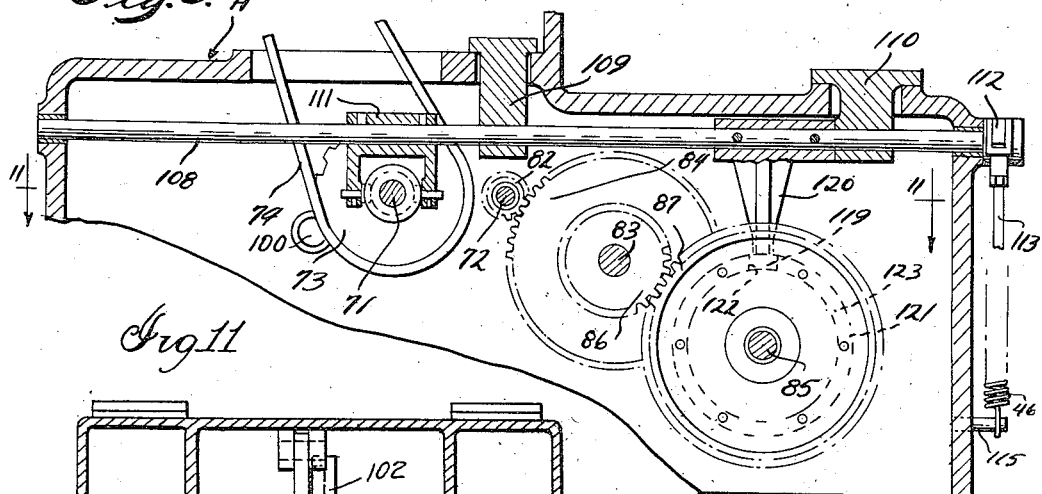
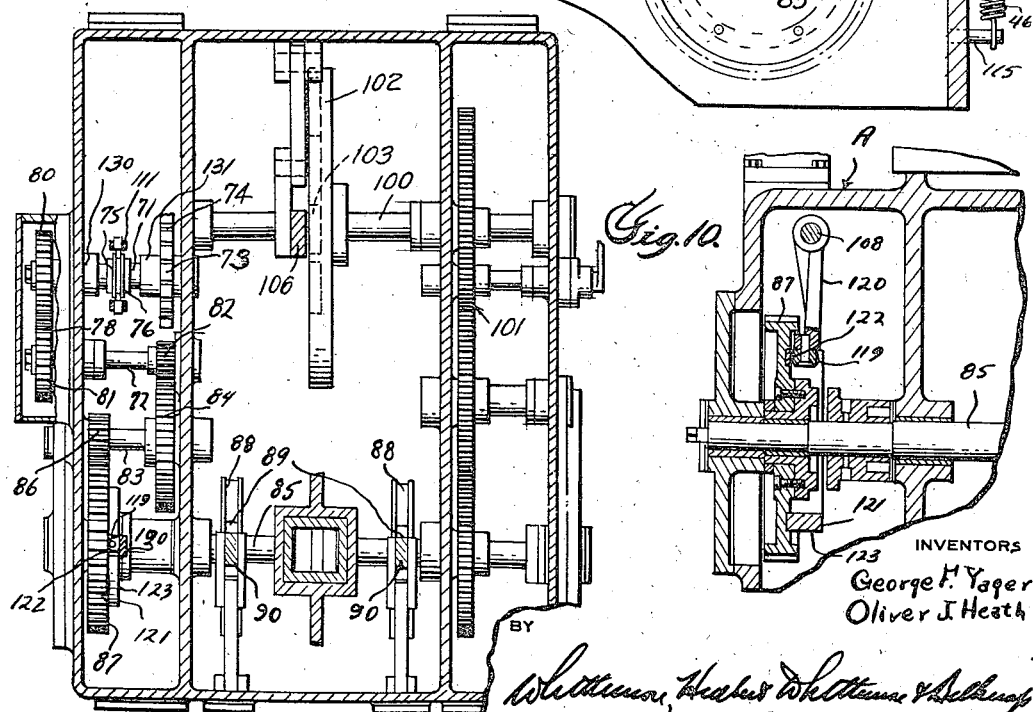

Patented Mar. 10, 1936

2,033,317

UNITED STATES PATENT OFFICE 2,033,317

MOLDING APPARATUS

George F. Yager and Oliver J. Heath, Toledo, Ohio, assignors to The Bunting Brass and Bronze Company, Toledo, Ohio, a corporation of Ohio Original application October 26, 1933, Serial No. 695,347. Divided and this application May 4, 1934, Serial No. 723,963

18 Claims. (Cl. 22—26)

This invention relates generally to molding apparatus and constitutes a division of our application filed October 26, 1933, bearing Serial No. 695,347.

One of the essential objects of the invention is to provide a molding apparatus wherein a squeeze table, ram and guard actuating and control means are operable without the use of either hand of the operator.

Another object is to provide a molding apparatus wherein the guard for the molding material is provided with effective latch means which may be rendered ineffective upon actuation of a suitable manually operable member such as a pedal, but will be rendered effective automatically.

Another object is to provide a molding apparatus wherein the guard for the molding material will be moved automatically to operative guarding position upon release of the latch mechanism.

Another object is to provide a molding apparatus wherein the actuating means for the ram and squeeze table are provided with brake and clutch mechanism which are under the control of the manually operable member aforesaid.

Another object is to provide a molding apparatus wherein the control means for the brake and clutch mechanism is such that it is unnecessary to retain the foot of the operator upon the pedal during the operation of the apparatus.

Other objects, advantages and novel details of construction of this invention will be made more apparent as this description proceeds, especially when considered in connection with the accompanying drawings, wherein:

Figure 1 is a top plan view of an apparatus embodying our invention;

Figure 2 is a side elevation of the apparatus with parts broken away and in section;

Figure 3 is a view similar to a portion of Figure 2, but showing the position of the parts after the mold forming operation;

Figure 4 is a view taken at substantially right angles to Figure 2 and showing parts broken away and in section;

Figure 5 is an enlargement of a portion of Figure 4 with parts broken away away and in section;

Figure 6 is a detail perspective view of the yoke forming part of the latch mechanism for the guard;

Figure 7 is a sectional view taken on the line 7—7 of Figure 6;

Figure 8 is a horizontal sectional view taken substantially on the line 8—8 of Figure 4;

Figure 9 is a vertical longitudinal sectional view taken substantially on the line 9—9 of Figure 4;

Figure 10 is a vertical transverse sectional view taken substantially on the line 10—10 of Figure 8;

Figure 11 is a horizontal sectional view taken substantially on the line 11—11 of Figure 9.

Referring now to the drawings, A is the main frame of the apparatus and B is an auxiliary frame mounted for vertical adjustment upon one side of the main frame and having an opening 1 in its lower end. C is a pattern box suspended from the lower end of the auxiliary frame B in vertical alignment with the opening 1 and D are crossbars spanning the opening 1 between the upper end of the pattern box C and an overhanging flange 2 of the auxiliary frame. 3 are dowels connecting the bars D to the upper end of the pattern box C; E is a pattern stripper plate at the lower end of the pattern box C; F is a core stripper plate within the box at the top thereof; G are studs terminally connected to said plates E and F; H are tubular spacers sleeved on said studs between said plates; I is a pattern plate movable vertically in the pattern box between the plates E and F; J are core strippers fixed to the core stripper plate F and extending through the pattern plate I and pattern stripper plate E; and K are patterns fixed to said pattern plate I and movable through the pattern stripper plate E. As shown, the patterns K are sleeved upon and are movable longitudinally of the core strippers J as in our Patent No. 1,846,306 dated February 23, 1932. Any suitable means such as the ram L and rods M may be used to move the pattern plate I vertically within the box C. As shown, the rods M are terminally connected to the pattern plate I and ram L while the latter is mounted for vertical movement on suitable guides 4 fixed to the auxiliary frame B. Located beneath the pattern box C is a dial 12 that is rotatable about an upstanding portion 13 of the frame A and is provided at spaced points thereof near its periphery with vertical openings 14. Mounted on the dial 12 over the openings 14 are platforms 15 which carry and serve as seats for flasks such as O. Beneath the dial 12 in vertical alignment with the pattern box C is a vertically movable squeeze table 16 having blocks 17 at its upper end movable through the openings 14 in the dial to raise the platforms 15 and flask O from the position illustrated in Figure 2 to that illustrated in Figure 3 after such parts have been moved by the dial to a position in vertical alignment with the pattern box C. Preferably the dial 12 and squeeze table 16 are the same as in our pending application, Serial No. 560,454.

For holding the dial 12 against rotation when the platforms 15 reach a position in vertical alignment with the pattern box C we have provided at spaced points of the dial 12 suitable upstanding pins 21, upstanding marginal border strips 22, and a locking member 23 fixed to a pivotally mounted hand lever 24 and having a forked end 25. Preferably the parts are so constructed and arranged that the forked end 25 of the locking member will engage one of the pins 21 when one of the platforms 15 is in vertical alignment with the pattern box C.

To prevent the molding material from escaping or being lost during the molding operation, we have provided a guard R which is sleeved upon the pattern box C for movement from the position illustrated in Figure 2 to that illustrated in Figure 3. Preferably this guard R is moved downwardly by spring pressed plungers 30 projecting from sockets in the pattern box C; is moved upwardly by the flask O as it is raised by the squeeze table 16; and is provided with manually and automatically operated latch mechanism S. As shown, the latch mechanism S comprises blocks 31 sleeved upon upstanding rods 32 welded to the guard R at opposite sides thereof, thrust pins 33 fastened to the blocks 31, and a pivotally mounted yoke 34 having cam portions 35 at opposite sides thereof engageable with the free ends of the thrust pins 33. Nuts 36 are adjustable on the pivots 37 for the yoke to tighten or loosen the tension. Preferably the free ends of the yoke are carried by the pivots 37 and the latter are carried by the auxiliary frame B, while an inverted L-shaped member 38 is fixed to the base 39 of the yoke at approximately the center thereof.

The manually operable means T for actuating the latch mechanism preferably comprises a vertically movable rod 40 engageable with the L-shaped member 38, a rocker 41 pivoted on the frame A and engageable with the rod 40, a vertically movable rod 42 pivotally connected to the rocker 41, a lever 43 connected at one end to the rod 42 and pivoted at its other end on the frame A, a pedal 44 and a link 45 terminally connected to the pedal 44 and lever 43. Preferably the pedal 44 is pivoted on the frame A and is provided with a coil spring 46. In this connection it will be observed that the link 45 connecting the pedal 44 and lever 43 is intermediate the rod 42 and pivot 47 for the lever. Hence when the pedal 44 is depressed against the tension of spring 46, the lever 43 will pull the rod 42 downwardly and cause the rocker 41 to raise the rod 40 and base 39 of the yoke. When the pedal 44 is released, as will be hereinafter more fully set forth, the lever 43 will be returned to normal position by spring 46 and the rod 40 and yoke 34 will be lowered by a plunger 51 and a coil spring follower 52 which collectively constitute the automatically operable means for the latch mechanism. As shown, the plunger 51 bears against the L-shaped member 38 and slidably engages a suitable bore 53 in the auxiliary frame B, while the spring 52 is located within said bore 53 between the upper closed end thereof and the upper end of the plunger.

Referring now to the drive mechanism for the squeeze table 16, 70 is an electric motor carried by the frame A; 71 and 72, respectively, are parallel shafts journaled in the frame; 73 is a pulley fixed to shaft 71 and driven by a belt 74 from motor 70; and 75 is a combination brake and clutch on shaft 71 and having a shifting collar 76. 77 is a disc rigid with shaft 72, and 78 is a sleeve upon a reduced portion of shaft 72 and connected by shearable pins 79 to disc 77. 80 and 81, respectively, are change speed gears rigid with shaft 71 and sleeve 78; 82 is a pinion rigid with shaft 72; 83 is a shaft journaled in the frame; 84 is a gear rigid with shaft 83 and driven by pinion 82; 85 is a shaft journaled in the frame; 86 is a pinion rigid with shaft 83; and 87 is a gear rigid with shaft 85 and driven by pinion 86. 88 are cams fixed to shaft 85; 89 are rollers engaging said cams; 90 are links connected to said rollers and to brackets 91 rigid with the squeeze table 16. Preferably each cam 88 is provided with a depressed portion 92, a raised portion 93 and a portion 94 of greater radius than the portion 93. The arrangement is such that upon the rotation of the cams for one revolution, the squeeze table will be first raised a slight amount and held in this raised position during a portion of the rotation of the shaft 85 and will then be raised further and held in this raised position for the remainder of the rotation of the shaft 85 or until the rollers 89 again engage the depressed portions 92 in the cams at which time the squeeze table will be returned to its lowered position.

Referring now to the driving mechanism for the ram L, 100 is a shaft journaled in the frame A; 101 represents gearing driving the shaft 100 from shaft 85; 102 is a cam fixed to shaft 100; 103 is a roller engaging the cam 102; 104 is a rocker pivoted to frame A; 105 is an adjustable link terminally connected to ram L and rocker 104; and 106 is a sectional driver terminally connected to rocker 104 and roller 103.

In the present instance the shifting collar 76 of the clutch and brake assembly 75 is preferably indirectly connected to pedal 44 so as to be actuated thereby. As shown, 108 is a rockshaft journaled in bearings 109 and 110 carried by the frame A; 111 is a yoke fixed to the rockshaft 108 and connected to the collar 76 at diametrically opposite points thereof; 112 is a rocker fixed to the rockshaft 108; and 113 is a link terminally connected to the rocker 112 and pedal 44. The spring 46 for the pedal 44 is terminally connected to the rocker 112 and to a pin 115 fixed to the frame A.

In order that shaft 85 will be limited to one complete revolution each time the pedal 44 is depressed, we have provided a roller 119 carried by a lever 120 fixed to rockshaft 108 and alternately engageable with an edge 121 of and a recess 122 in a ring 123 fixed to one side of gear 87. Preferably the arrangement is such that the roller 119 is withdrawn from the recess 122 by the lever 120 when the pedal 44 is depressed. At the same time the collar 76 is shifted by the yoke 111 to release the brake 130 and render the clutch 131 operative to connect the pulley 73 to shaft 71. As a result gear 87 will rotate shaft 85 and in doing so will cause ring 123 to turn therewith. The roller 119 will then ride on edge 121 of ring 123 holding clutch 131 engaged until gear 87 completes one revolution whereupon roller 119 will be returned by spring 46 into recess 122 in ring 123, releasing clutch 131 and causing brake 130 to become operative.

In use, a flask such as O may be placed upon the platform 15 just to the left of the pattern box C and filled with molding material up to the level indicated by the reference character X. The lever 24 is then swung outwardly to unlock the forked end 25 of the locking member from one of the pins 21. The rotatable dial 12 may then be turned so that the flask O filled as described will be positioned beneath and in vertical alignment with the pattern box C. The lever 24 may then be swung inwardly so that the forked end 25 of the locking member will engage another of the pins 21 to hold the dial 12 against movement. When the parts are in this position the pedal 44 may be depressed. This will cause (1) the roller 119 to be withdrawn from recess 122 in ring 123; (2) brake 130 to be released: (3) clutch 131 to be rendered operative so that shaft 85 will be rotated and cause cams 88 and 102 to actuate the squeeze table 16 and ram L; and (4) yoke 34 to be lifted so that guard R will be released. Upon actuation of shaft 85, cams 88 will first elevate the squeeze table 16 so that the blocks 17 will raise the flask O, and the guard R will be moved downwardly by the plungers 30 into engagement with the raised flask O, as illustrated in Figure 3. At this same time the cam 102 will cause the ram L to be moved downwardly so that the patterns K will be moved through the stripper plate E into the molding material in the flask O. After the patterns K have been lowered as described the cams 88 will cause the squeeze table 16 to be raised further, consequently the flask O and guard R will be moved upwardly in unison relative to the pattern box C. As a result the molding material in the flask O will be squeezed and compressed, while further rotation of cam 102 will cause ram L and patterns K to be raised. Upon the upward movement of the patterns K the core strippers J and pattern stripper plate E will function to strip the interior and exterior surfaces of the patterns. Further rotation of the cams 88 will cause the squeeze table 16 and flask O to be lowered. After the gear 87 has made one complete revolution roller 119 will be returned by spring 46 into recess 122, hence the pedal 44 will be returned to its raised position, the clutch 131 will be rendered inoperative, the brake 130 will be rendered operative, and the base 39 of the yoke 34 will be moved downwardly by the spring pressed plunger 51 to cause the cam portions 35 to engage the thrust pins 33 and frictionally hold the rods 32 and guard R in raised position. The dial 12 may then be unlocked and the operations just mentioned may be repeated. If the mold formed is the drag then a suitably formed cope (not shown) may be superposed on the drag after it has moved from beneath the pattern box C. Following this the assembled parts of the mold may be removed from the dial.

What we claim as our invention is:

1. In a molding apparatus, a flask containing molding material, a pattern engageable with said molding material, a guard for said molding material, means controlling operation of the guard, means for actuating the pattern, a clutch controlling said pattern actuating means, an operating member, means operable by said member for actuating said clutch, and means operable by said member for actuating said guard control means.

2. In a molding apparatus, a flask containing molding material, means for squeezing said molding material, means for guarding said molding material during the squeezing operation, control means for said guard means, actuating means for the squeeze means including a gear, a clutch controlling the operation of said gear, an operating member, means including a rockshaft operable by said member for actuating said clutch, means operable by said member for actuating said guard control means, and means associated with the rockshaft and gear for controlling the actuation of said clutch and guard control means.

3. In a molding apparatus, a flask containing molding material, a pattern engageable with said molding material, a guard for the molding material movable relative to said flask, latch mechanism controlling operation of said guard, a clutch controlling operation of the pattern, an operating member, and means operable by said member for actuating said clutch and said latch mechanism.

4. In a molding apparatus, a flask containing molding material, a pattern engageable with said molding material, a guard for the molding material movable relative to said flask, latch mechanism controlling operation of said guard, a clutch controlling operation of the pattern, means for actuating said clutch, means for actuating said latch mechanism, and a common operating member for said actuating means.

5. In a molding apparatus, a flask containing molding material, a pattern engageable with said molding material, a guard for the molding material movable relative to said flask, latch mechanism controlling operation of the guard, a clutch controlling operation of the pattern, an operating member, means operable by said member for actuating said guard, means operable by said member for actuating said clutch, and means associated with the last mentioned means for controlling the operation of both actuating means.

6. In a molding apparatus having a vertically movable flask containing molding material, a pattern box in the path of said flask, a pattern in the box operable to engage molding material in the flask, a clutch controlling the movements of the pattern and flask, means for preventing the escape of molding material from the flask when engaged by the pattern including a guard movable relative to the box, and a common control for the clutch and guard.

7. In a molding apparatus, a vertically movable flask containing molding material, a pattern box in the path of said flask, a clutch controlling the movements of the flask, a guard movable on the box to prevent the escape of molding material from the flask, and a common control for the clutch and guard.

8. In a molding apparatus, a squeeze table, a ram, a guard for molding material, a shaft, a driving connection between said shaft and ram, a driving connection between said shaft and squeeze table, a second shaft, a drive pulley for said second mentioned shaft, a clutch for connecting the pulley to said second mentioned shaft, a brake for said second mentioned shaft, a driving connection between the first and second mentioned shafts, operating means for said guard, and means for controlling the operation of the clutch and brake aforesaid including means connected to and operable by said guard operating means.

9. In a molding apparatus, a squeeze table, a ram, a guard for molding material, a shaft, a driving connection between said shaft and ram, a driving connection between said shaft and squeeze table, a second shaft, a drive pulley for said second mentioned shaft, a clutch for connecting the pulley to said second mentioned shaft, a driving connection between the first and second mentioned shafts, operating means for said guard, and means for controlling the operation of the clutch aforesaid including means connected to and operable by said guard operating means.

10. In a molding apparatus, means for subjecting molding material to a pressure, means for guarding the molding material while it is subjected to a pressure, actuating means for the first mentioned means, means for controlling the operation of said actuating means including a clutch, an operating member, means actuable by said member for controlling the action of said guarding means, and means actuable by said member for controlling the action of said clutch.

11. In a molding apparatus, means for subjecting molding material to a pressure, means for guarding said molding material while it is subjected to a pressure, actuating means for the first mentioned means, means for controlling the operation of said actuating means including a clutch, a rockshaft, an operating member for rocking said shaft in one direction, a spring for rocking said shaft in the opposite direction, means independent of said rockshaft actuable by said operating member for controlling the action of said guarding means, and means carried by said shaft operable when the shaft is actuated by said member for rendering the clutch effective, and operable when the shaft is actuated by said spring for rendering the clutch ineffective.

12. In a molding apparatus, means for subjecting molding material to a pressure, means for guarding the molding material while it is subjected to a pressure, actuating means for the first mentioned means, means for controlling the operation of said actuating means including a clutch, an operating member, means actuable by said member for controlling the action of said guarding means, and means wholly independent of said last mentioned means actuable by said member for controlling the action of said clutch.

13. In a molding apparatus, a flask containing molding material, a pattern engageable with said molding material, means for actuating said pattern, a guard for said molding material, two independently operable means, a clutch controlling the pattern actuating means actuable by one of said independently operable means, means controlling the operation of said guard actuable by the other of said independently operable means, and a common operating means for said independently operable means.

14. In a molding apparatus, a flask for molding material, a guard for the molding material in the flask movable from an inoperative position to an operative guarding position and vice versa, means for holding the guard in the inoperative position, and means controlling the action of the holding means including pedal actuated means operable to actuate the holding means so as to release the guard, said guard being movable automatically from inoperative to operative guarding position when released and being movable by the flask from operative guarding position to the inoperative position, and means operable automatically when the pedal actuated means is ineffective for automatically rendering the holding means aforesaid effective.

15. In a molding apparatus, a flask for molding material, a guard for the molding material in the flask movable from an inoperative position to an operative guarding position and vice versa, means for holding the guard in the inoperative position, manually operable means for rendering the holding means ineffective, means operable to move the guard from inoperative to operative guarding position, said guard being movable by the flask from operative guarding position to inoperative position, and means operable automatically upon release of the manually operable means for rendering the holding means effective.

16. In a molding apparatus, a flask for molding material, a guard for the molding material in the flask movable from an inoperative position to an operative guarding position and vice versa, means for holding the guard in the inoperative position, manually operable means for rendering the holding means ineffective, means operable automatically when the holding means is rendered ineffective for moving the guard from inoperative to operative guarding positions, said guard being movable by the flask to operative guarding position from inoperative position, and means for making the holding means aforesaid effective for holding the guard when the manually operable means aforesaid is rendered ineffective.

17. In a molding apparatus having a vertically movable flask for molding material, a pattern box in the path of the flask, means for preventing the escape of molding material from the flask including a guard sleeved upon the pattern box and movable from an inoperative position to an operative guarding position and vice versa, means for holding the guard in the inoperative position including rods fastened to the guard, blocks sleeved on the rods, one to each rod, thrust pins fastened to the blocks, one to each block, and a pivotally mounted yoke having cam portions engageable with said thrust pins, pedal actuated means engageable with the yoke to effect a release of the guard, spring means operable when the guard is released to move it from inoperative to operative position, said guard being movable by the flask from operative guarding to inoperative position, and means operable automatically when the pedal actuated means aforesaid is ineffective for rendering the holding means aforesaid effective, including spring pressed means engageable with the pivotally mounted yoke.

18. In a molding apparatus, a pattern box, a flask movable in a horizontal plane and in a vertical plane relative to said box, a movable guard for molding material in the flask carried by said box and engageable with the flask when the latter is moved in a vertical plane, an operating member, means for controlling the action of said guard including means actuable by said member, means controlling the movement of the flask in the horizontal plane, and means controlling the movement of the flask in the vertical plane including means under the control of the second mentioned control means and actuable by the first mentioned means.

GEORGE F. YAGER.
OLIVER J. HEATH.